J. ELDER, Jr.
Automatic Valves for Steam-Radiators.

No. 158,692.  Patented Jan. 12, 1875.

Witnesses
Chas. H. Smith
Geo. Pinckney

Inventor
John Elder Jr.
per Lemuel W. Serrell
atty.

UNITED STATES PATENT OFFICE.

JOHN ELDER, JR., OF NEW YORK, N. Y.

IMPROVEMENT IN AUTOMATIC VALVES FOR STEAM-RADIATORS.

Specification forming part of Letters Patent No. 158,692, dated January 12, 1875; application filed May 5, 1874.

*To all whom it may concern:*

Be it known that I, JOHN ELDER, Jr., of the city and State of New York, have invented an Improvement in Air-Valves for Steam Radiators, Coils, &c., of which the following is a specification:

In steam radiators and coils it is usual to provide an air-valve, through which the air escapes, and said valve is closed by expansion due to change of temperature when the steam reaches the valve. A spring mounted in a movable bar within the tube, and contiguous to the air-valve, has been used to act upon the valve, but the bar obstructs the free passage of air or steam to the valve, and, being exposed to the same temperature, the spring will only be changed in form, in consequence of the difference in expansion due to the difference of metals, the spring usually being of brass and the bar of iron.

My improvement is made with reference to simplifying the construction and dispensing with the said bar. I make use of a tube with a shoulder upon the interior, against which one end of the spring rests, and at the other end the spring is supported by a block and movable cap at the end of the tube. Thereby the spring is held in position without any bar, and the surrounding tube will not heat up and expand as rapidly as the spring. The air-valve screws into the spring, and, as it has to be adjusted from time to time, it is liable to be disconnected and lost. I apply a guard around the valve-stem, with an opening for such stem that is smaller than the valve, so that said valve cannot be accidentally withdrawn too far or lost.

Figure 1:
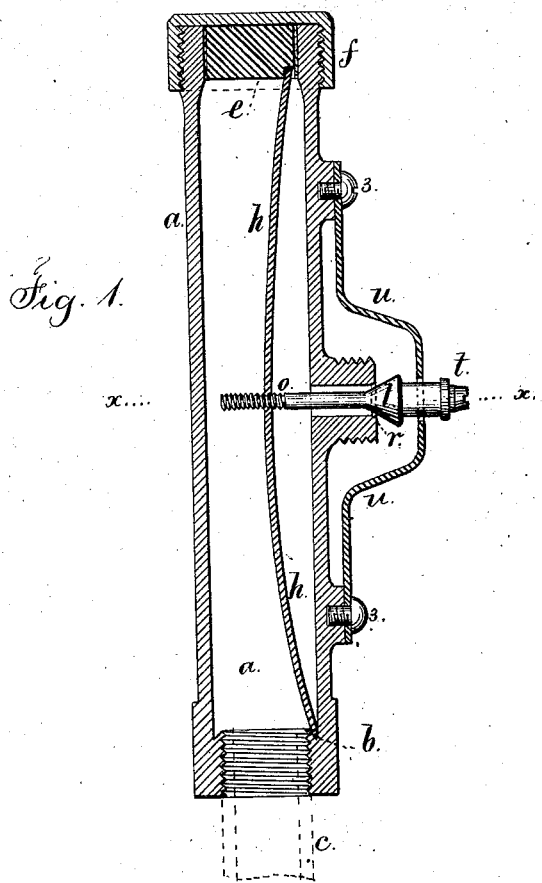
Figure 2:
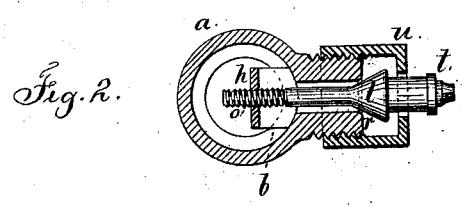

In the drawing, Figure 1 is a vertical section of the improvement complete, and Fig. 2 is a sectional plan at the line *x x*.

The tube *a* is made with a shoulder, *b*, preferably contiguous to the screw-thread by which the tube *a* is connected to the tube *c* of the steam radiator or coil. The tube *a* is open at the upper end and receives a block, *e*, within a recess, and a cap, *f*, is screwed upon the end and confines the parts firmly. The spring *h*, of brass or similar material, is introduced within the tube *a* before the block *e* is inserted, and said block confines the end of the spring firmly, and retains the spring to its place between the shoulder *b* and the block *e*. The air-valve *l* is made with a screw-stem, *o*, passing through said spring *h*, and a seat, *r*, is provided for such valve, and the valve-stem is adjusted so that the valve will remain open except when the spring is expanded and its curvature increased.

The valve-head *t* may be milled, so that the valve can be easily adjusted, and this head is smaller than the valve, so that the guard *u* can be introduced around the valve *l*, between that and the head, the opening in such guard being smaller than the valve, so that said valve cannot be entirely removed, except after removing this guard.

The guard may be made of sheet metal in the form of a bridge, secured by the screws 3 3, shown in Fig. 1, or, as a thimble screwed upon the projection forming the valve-seat, as shown in Fig. 2.

I am aware that a spring has been sustained at its ends within a tube, and that the center portion of such spring has acted as a valve against a tubular seat, as in the Patent of W. W. Bartol, No. 65,047. In this case, the adjustment can only be effected by revolving the spring and tube or the tubular seat, and as the air-valves of radiators frequently require adjustment, as well as cleaning, this device is inconvenient. By my construction the valve is easily adjusted or cleaned, because the screw-spindle passes through the spring, and the parts receiving and sustaining the ends of the spring secure that spring firmly and reliably in its relation to the valve-seat.

I claim as my invention—

1. The tube *a*, made with the inward shoulder *b*, near one end, and the block *e*, having a recess at one side and secured by the cap *f*, in combination with the spring *h*, supported by such shoulder *b* and recess, and the air-valve having a screw-stem that is introduced from outside the tube *a*, and passes through the spring, as and for the purposes set forth.

2. The guard *u*, surrounding the stem of the valve, and made with an opening of less diameter than the valve, in combination with the tube *a*, adjustable air-valve *l*, and spring *h*, as and for the purposes set forth.

Signed by me this 1st day of May, A. D. 1874.

JOHN ELDER, JR.

Witnesses:
 DOUGLAS A. LEVIEN, Jr.,
 GEO. T. PINCKNEY.